Figure 1:
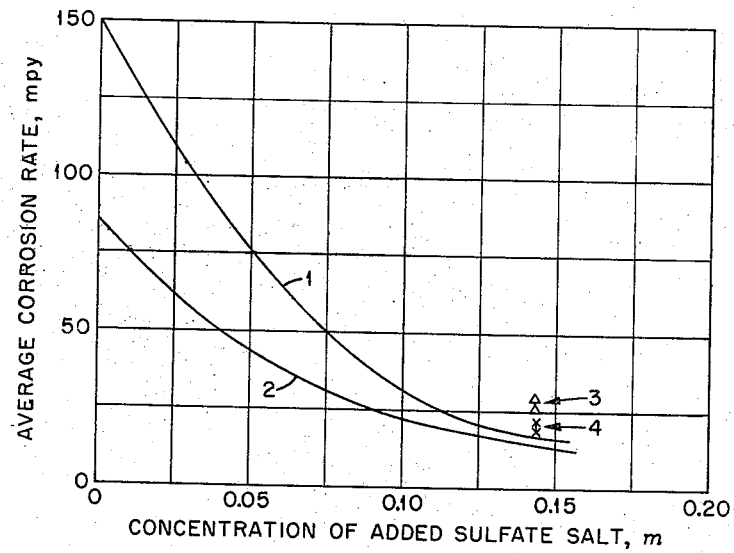

Aug. 23, 1960  E. G. BOHLMANN ET AL  2,950,167
METHOD OF INHIBITING CORROSION IN URANYL SULFATE SOLUTIONS
Filed Feb. 19, 1958

INVENTORS
John C. Griess, Jr. and
Edward G. Bohlmann

United States Patent Office 2,950,167
Patented Aug. 23, 1960

---

2,950,167

METHOD OF INHIBITING CORROSION IN URANYL SULFATE SOLUTIONS

Edward G. Bohlmann, Concord, and John C. Griess, Jr., Oak Ridge, Tenn., assignors to the United States of America as represented by the United States Atomic Energy Commission Filed Feb. 19, 1958, Ser. No. 716,252

2 Claims. (Cl. 23—14.5)

Our invention relates to corrosion inhibition and more particularly to the treatment of a uranyl sulfate solution in order to inhibit corrosion and simultaneously to increase the two-liquid phase separation temperature of the solution.

Aqueous uranyl sulfate solutions are extensively useful in homogeneous nuclear reactors. For example, a relatively dilute uranyl sulfate solution containing less than approximately 15 grams of fissionable uranium, i.e., $U^{233}$ or $U^{235}$, per liter of water is utilized as the fuel solution which is circulated through the central core of a two-region reactor of the type described in a paper, entitled "The Homogeneous Reactor Test," by S. E. Beall and J. A. Swartout, presented at the International Conference on the Peaceful Uses of Atomic Energy, Geneva, Switzerland, 1955, Paper No. 498. Relatively concentrated uranyl sulfate solutions containing at least 300 grams of uranium per liter may be utilized as the blanket solution in a plutonium-producing, two-region reactor. Plutonium is produced by neutron irradiation of $U^{238}$ in the blanket solution. Relatively concentrated uranyl sulfate solutions having a uranium concentration of 100 to 500 grams uranium per liter may also be employed as fuel solution in a one-region plutonium-producing reactor. In this type reactor both fission and plutonium production take place in one circulating system. Although ordinary water may be employed for these uranyl sulfate solutions, heavy water is preferred because of its more desirable nuclear properties. The method of operating both one and two-region homogeneous nuclear reactors in which uranyl sulfate solutions may be utilized are described in a report, TID-7524, entitled, "HRP Civilian Power Reactor Conference Held at Oak Ridge, March 21-22, 1956," issued March 1957.

One of the most serious problems involved in the use of aqueous uranyl sulfate solutions in homogeneous nuclear reactors is corrosion of metals in the reactor system by the solutions. Certain metals, such as zirconium-base alloys which are preferably employed for the reactor core vessel, and titanium-base alloys used in valves and fittings, are not appreciably corroded by uranyl sulfate solutions except as a result of radiation. However, stainless steels, extensively employed in such reactor systems, are corroded considerably by uranyl sulfate solutions, aside from any additional corrosion effects produced by radiation.

Corrosion is harmful in two respects to the operation of the reactor. Corrosion products, if allowed to build up in the solution, constitute neutron poisons and lower the efficiency of the reactor. In addition, corrosion weakens the metal structurally, making the metal subject to failure under high-pressure stresses.

Corrosion of stainless steels by uranyl sulfate solutions is influenced by numerous variables, the most important being temperature, uranium concentration, the flow rate of the solution, and the amount of free acid in the solution. The corrosion rate is highly dependent on temperature. In the region from room temperature to 150° C. the passivity of stainless steel is sufficient to prevent serious attack, and corrosion rates of less than one mil per year are observed. In the temperature range from 150° C. to 225° C. the corrosion rate increases rapidly with temperature. For example, the corrosion rate of type 347 stainless steel by a uranyl sulfate solution having a uranium concentration of 40 grams per liter and at flow rates of 10 to 20 f.p.s. (feet per second) is 8 m.p.y. (mils per year) at 200° C. and 29 m.p.y. at 225° C. In this temperature range there is a slight decrease in the corrosion rate with time, probably resulting from the formation of an oxide coating on the metal. In this temperature range the corrosion rate also varies directly with the uranium concentration, ranging from 1 m.p.y. for 0.04 m $UO_2SO_4$ to 50 m.p.y. for 1.3 m $UO_2SO_4$. At temperatures above 225° C. stainless steel undergoes an initial rapid attack, but a protective anhydrous oxide film forms on the metal. This film is protective under certain conditions, and after the approximately 100 hour period required for formation of the film, the continuing corrosion rates are very low. However, at temperatures above 225° C. the flow rate of the solution becomes the most important variable. Under a given set of conditions of solution composition and temperature the protective oxide film persists to a certain solution velocity, herein referred to as the critical velocity. Above this critical velocity the protective film is not stable and the metal is left unprotected, resulting in a rapid corrosion rate.

The critical velocity of the solution is affected by other variables in the system. As the uranium concentration is increased, the critical velocity decreases; the amount of metal involved in film formation in the less-than-critical velocity region increases; and the bare-metal corrosion rate increases. As the temperature is increased, the amount of metal involved in film formation decreases, the critical velocity increases, and the bare-metal corrosion rate increases. If sulfuric acid is present in the solution, an increase in sulfuric acid concentration increases the amount of metal involved in film formation, decreases the critical velocity and slightly increases the bare-metal corrosion rate. In order that a uranyl sulfate solution may be circulated through the reactor system without excessive corrosion, the solution must be circulated at a flow rate below the critical velocity. For practical operation of a reactor, a minimum critical velocity of approximately 20 f.p.s. under reactor operating conditions is desirable.

Another problem associated with the use of an aqueous uranyl sulfate solution is the appearance of a second liquid phase in the solution at elevated temperatures. At temperatures above 270° C. a uranyl sulfate solution separates into two liquid phases with a resulting higher concentration of uranium in one of the phases than in the other. This condition would result in highly erratic operation of a nuclear reactor and thus serves to limit the operating temperature of the reactor. The temperature at which this phase separating occurs varies with the concentration of uranyl sulfate. For example, at a uranyl sulfate concentration of 10 grams uranium per liter $D_2O$, phase separation occurs at over 310° C., while at a concentration of 60 grams uranium per liter $D_2O$ the phase separation temperature is decreased to slightly over 280° C. The phase separation temperature for a given uranium concentration may be increased by the addition of excess sulfuric acid to the solution. For example, at a concentration of 60 grams uranium per liter $D_2O$, the addition of ten mole percent excess sulfuric acid, based on the concentration of uranium, increases the phase separation temperature to over 290° C., and at twenty percent excess sulfuric acid this temperature is increased to 300° C. The addition of large quantities of excess sulfuric acid, however, results in highly increased corrosion rates on stainless steels. The phase separation of uranyl sulfate solutions is further discussed in The Reactor Handbook, v. 2, chapter 4.3, AECD–3646, May 1955.

In order that the phase separation and corrosion properties of an aqueous uranyl sulfate solution employed in a nuclear reactor may be improved by means of an additive, the additive must meet several requirements. The additive must be soluble in the uranyl sulfate solution at reactor operating temperatures from approximately 100° C. to 350° C. In addition the additive must be chemically compatible with the other solution constituents, including copper sulfate, added to catalyze the recombination of radiolytically produced hydrogen and oxygen, sulfuric acid, added to stabilize the solution and an oxidizing agent, such as oxygen. The additive must also exhibit low neutron absorption characteristics and stability in the presence of intense radiation.

It is, therefore, an object of our invention to provide a method of inhibiting the corrosive properties of aqueous uranyl sulfate solutions.

Another object is to provide a method of reducing the corrosion rate of stainless steels by aqueous uranyl sulfate solutions.

Another object is to provide a method of increasing the phase separation temperature of aqueous uranyl sulfate solutions.

Another object is to provide a method of simultaneously increasing the phase separation temperature and inhibiting the corrosive properties of an aqueous uranyl sulfate solution in a homogeneous nuclear reactor.

Another object is to provide a method of accomplishing the above-listed objects while maintaining the stability of an aqueous uranyl sulfate solution under the operating conditions of a homogeneous nuclear reactor.

In accordance with our invention an aqueous uranyl sulfate solution may be treated to inhibit the corrosive properties of the solution by the addition of a metal sulfate selected from the group consisting of lithium sulfate, magnesium sulfate and beryllium sulfate. This treatment substantially reduces the corrosion rate of stainless steels by the solution and in the case of lithium and beryllium, also serves to elevate the phase separation temperature of the solution. These salts are stable in uranyl sulfate solutions at concentrations and temperatures suitable for use in nuclear reactors, and the neutron absorption characteristics of these salts are such that the efficiency of a nuclear reactor is not unduly lowered by their presence. The resulting uranyl sulfate solution with added sulfate may be satisfactorily employed in the intense radiation field of a nuclear reactor.

We have found that the addition of soluble sulfates substantially reduces the corrosion rate of uranyl sulfate solutions on stainless steels. Although our invention is not to be understood as limited to a particular theory, the decreased corrosion rate is postulated to result from the reaction of uranyl and sulfate ions to form a complex. The corrosion rate of stainless steels is generally proportional to the uranyl ion concentration in the uranyl sulfate solution. The formation of a complex lowers the uranyl ion concentration, thereby reducing the corrosion rate. It is also possible that the reduced corrosion results from the reduction in acidity of the system due to the formation of bisulfate ions.

The inhibiting effect of the added sulfate does not appear to be dependent on the cation component of the sulfate salt, so that any sufficiently soluble sulfate may be employed to inhibit corrosion. However, the only sulfates with the required solubility and neutron absorption characteristics suitable for use in a nuclear reactor are the sulfates of lithium, magnesium and beryllium. Lithium sulfate containing naturally occurring lithium is unsuitable for reactor use because of the presence of 7.4 percent of the lithium isotope of atomic weight six, which has a relatively high neutron absorption cross section. However, lithium sulfate containing isotopically enriched lithium 7 may be employed. Cesium sulfate is particularly soluble and effective in inhibiting corrosion, but the high neutron absorption cross-section of cesium renders this salt unsuitable for reactor use. Sodium sulfate is also effective in reducing corrosion, but has the disadvantages of limited solubility and a neutron absorption cross-section slightly higher than desired.

The solution conditions under which the sulfate additives of our invention may be employed vary with each of the sulfates. Lithium sulfate may be employed in an aqueous uranyl sulfate solution in the concentration range of 0.1 m to 4.0 m uranyl sulfate at temperatures from approximately 100° C. to approximately 350° C. to the extent of producing a concentration of lithium sulfate within the range of approximately 0.25 to approximately 1.3 times the molal concentration of uranyl sulfate, with a concentration within the range of 0.75 to 1.3 times the uranyl sulfate concentration being preferred.

At uranyl sulfate concentrations of under 0.1 m, lithium sulfate is unstable, with precipitates gradually being formed in the solution unless an excessive amount of sulfuric acid is present. At the more dilute uranyl sulfate concentrations above 0.1 m, i.e., from 0.1 m to approximately 0.2 m, a slight amount of sulfuric acid is necessary to maintain solution stability. For example, sulfuric acid in the concentration range of 0.02 m to 0.04 m may be required to maintain the stability of a 0.1 m to 0.2 m uranyl sulfate solution having added lithium sulfate at temperatures up to approximately 250° C. This amount of sulfuric acid increases the corrosiveness of the solution somewhat, but not to an excessive extent. At higher temperatures more acid is required to maintain solution stability at these relatively dilute uranyl sulfate concentrations, but the corrosiveness of the solution is not appreciably modified, since the increase in temperature tends to increase the critical velocity to compensate for the increased acid which tends to decrease the critical velocity.

Magnesium sulfate may be employed in solutions having a uranyl sulfate concentration of 0.1 m to 1.3 m at temperatures from approximately 100° C. to 250° C. to the extent of producing a magnesium sulfate concentration from 0.25 to 1.3 times the molal concentration of uranyl sulfate. A magnesium sulfate concentration in the range of 0.75 to 1.0 times the uranyl sulfate concentration is preferred.

Uranyl sulfate-magnesium sulfate solutions are unstable at temperatures above 250° C. and at uranyl sulfate concentrations below 0.1 m unless an excessive amount of sulfuric acid is added to the solution. In addition, at uranyl sulfate concentrations in the range of 0.1 m to 0.2 m, sulfuric acid in the range of 0.02 m to 0.04 m is required to maintain solution stability.

Beryllium sulfate may be employed in solutions having a uranyl sulfate concentration in the range of approximately 0.03 m to 4.0 m at temperatures from approximately 100° C. to 325° C. to the extent of producing a concentration of beryllium sulfate in the range of 0.25 to 2.0 times the molal concentration of uranyl sulfate. A beryllium sulfate concentration in the range of 0.75 to 1.5 times the molal concentration of uranyl sulfate is preferred.

The uranyl sulfate-beryllium sulfate solution is more stable at low concentrations of uranyl sulfate than the solutions produced by the addition of lithium or magnesium sulfate. This increased stability is postulated to result from the more acid hydrolysis of beryllium sulfate in solution. Unlike solutions employing lithium and magnesium sulate additives, uranyl sulfate-beryllium sulfate solutions require no sulfuric acid to maintain solution stability up to 250° C. at the more dilute uranyl sulfate concentrations. A slight amount of acid may be required at temperatures over 250° C.

Our invention is further illustrated by the following specific examples.

EXAMPLE I

Experiments were conducted to determine the effect of added sulfates on the corrosion rate of type 347 stainless steel by a 0.17 m uranyl sulfate solution circulated at velocities of 13 feet per second and 68 feet per second. One hundred hour runs were made at a temperature of 250° C. at added lithium sulfate concentrations of 0.035 m, 0.07 m, 0.010 m and 0.15 m and at an added magnesium sulfate concentration of 0.14 m. Each run was conducted in the following manner: Two 1⅜ inch by 1⅜ inch by ⁹⁄₁₀ inch type 347 stainless steel coupons were inserted in a titanium loop in which the uranyl sulfate solution with added sulfate was circulated at a velocity of 13 f.p.s., and two coupons were exposed to a solution of the same concentration circulating at 68 f.p.s. After exposure to the solution for 100 hours the coupons were removed and weighed to determine the weight loss. The average corrosion rate in mils per year was then calculated from the weight loss. The results obtained may be seen by reference to Fig. 1. Curve 1 represents the values obtained at various lithium sulfate concentrations at a velocity of 68 f.p.s. Curve 2 represents the values obtained at 13 f.p.s. The points referred to by reference numerals 3 and 4 represent the values for the 0.14 m magnesium sulfate solution at velocities of 68 f.p.s. and 13 f.p.s., respectively. It may be readily seen that the corrosion rate decreased substantially with increased lithium sulfate concentrations at both velocities. The values obtained for 0.14 m magnesium sulfate indicate that its corrosion inhibition behavior is similar to that of lithium sulfate.

EXAMPLE II

Figure 2:
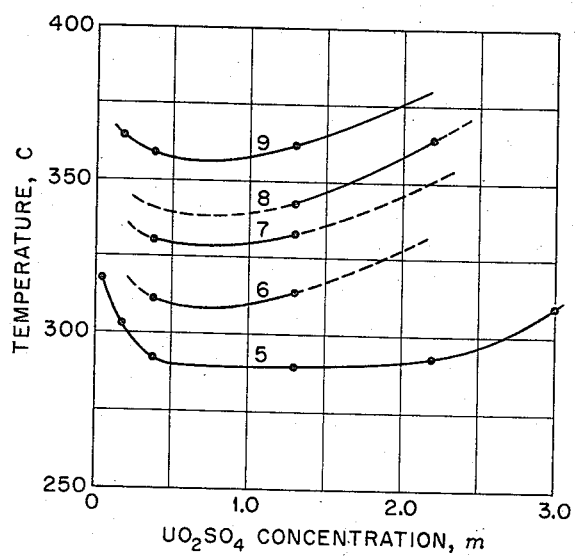

Experiments were conducted to determine the effect of various amounts added lithium sulfate on the phase-separation temperature of aqueous uranyl sulfate solutions. In each experiment a 1 mm. silica tube was filled to approximately one-half its capacity, fused shut and heated until a second phase developed. The tube was observed for phase separation by means of a ten power microscope, and the temperature was measured by means of a thermocouple and a conventional indicator. The results obtained may be seen by reference to Fig. 2. The phase separation temperature values obtained for uranyl sulfate solutions with no added lithium sulfate are represented by curve 5. Curve 6 represents the values obtained for uranyl sulfate with added lithium sulfate at concentrations ¼ the molal concentration of uranyl sulfate; curve 7 represents added lithium sulfate at concentrations ½ the concentration of uranyl sulfate; curve 8 represents added lithium sulfate in concentrations 0.7 times the concentration of uranyl sulfate and curve 9 represents equimolal uranyl sulfate-lithium sulfate. It may be seen from Fig. 2 that lithium sulfate substantially elevated the phase separation temperature, particularly at the higher concentrations relative to the uranyl sulfate concentration.

EXAMPLE III

Figure 3:
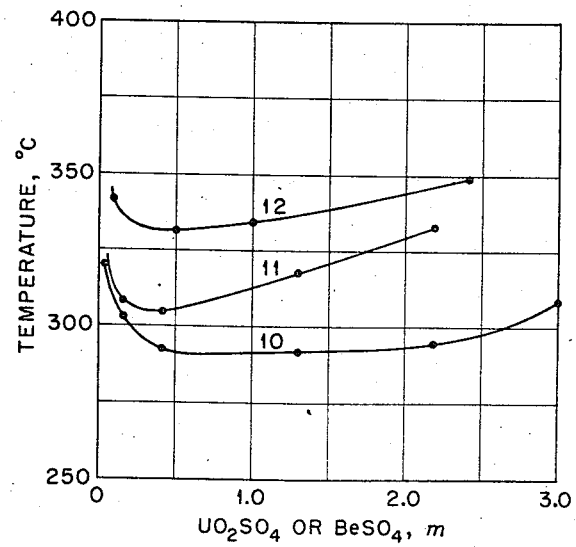

Experiments were conducted by the method of Example II to determine the effect of added beryllium sulfate on the phase separation temperature of uranyl sulfate solutions. The curves obtained by these experiments may be seen by reference to Fig. 3. The values for the phase separation temperature of uranyl sulfate with no added sulfate are represented by curve 10. The values obtained for equimolal beryllium sulfate-uranyl sulfate solutions are represented by curve 11, and the values for beryllium sulfate solutions without uranyl sulfate are represented by curve 12. It may be seen that the phase separation temperature was substantially elevated by the addition of equimolal beryllium sulfate.

EXAMPLE IV

Figure 4:
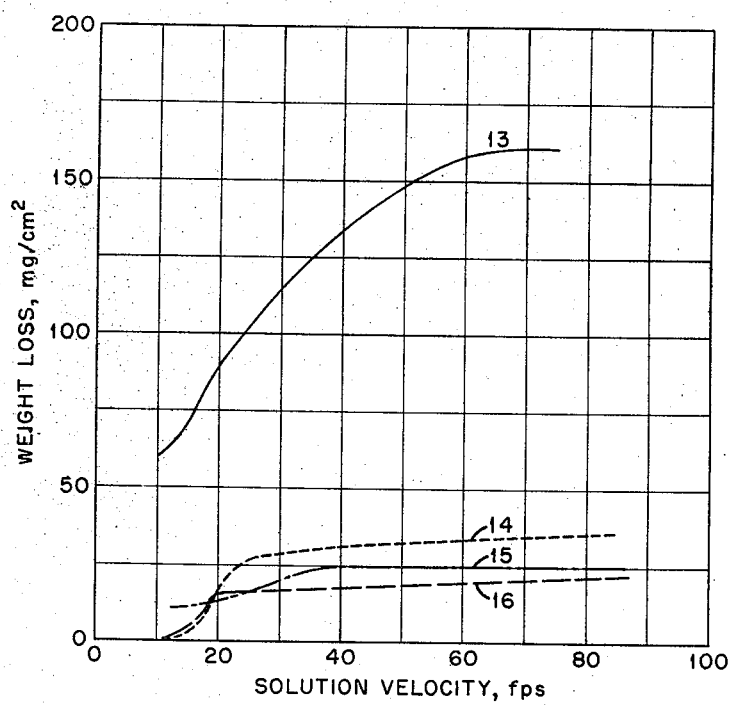

Experiments were conducted to determine the effect of added magnesium and lithium sulfates on the corrosion of type 347 stainless steel by a 1.1 m uranyl sulfate solution circulated at a temperature of 225° C. One hundred hour runs were made at various velocities for each solution. In each run four type 347 stainless steel coupons were inserted in a stainless steel loop circulating the solution. Upon completion of each run the coupons were weighed to determine the weight loss. Curve 13 represents the values obtained for the uranyl sulfate solution with no added sulfates. Curves 14 and 16 represent the values obtained for 1.1 m uranyl sulfate–1.1 m magnesium sulfate solutions, and curve 15 represents the values obtained for a 1.1 m uranyl sulfate–1.2 m lithium sulfate solution. It may be seen by reference to Fig. 4 that magnesium and lithium sulfates substantially reduced corrosion at all velocities tested.

EXAMPLE V

Experiments were conducted by the method of Example IV to determine the corrosion effects of the addition of equimolal lithium sulfate to uranyl sulfate in the concentration range of 40 to 200 grams uranium per liter. Runs were made with and without lithium sulfate at uranium concentrations of 40 grams per liter at 250° C., 100 grams uranium per liter at 250° C. and 300° C., and 200 grams per liter at 250° C. The results of these runs may be seen by reference to Table I. In all cases the weight loss and corrosion rates were substantially higher for the solutions without added sulfate.

Table I

*Corrosion of type 347 stainless steel in uranyl sulfate solutions with and without equimolal lithium sulfate*

| Uranium Concentration (g./liter) | Temperature (° C.) | Solutions with Li₂SO₄ | | Solutions Without Li₂SO₄ | |
|---|---|---|---|---|---|
| | | Weight Loss at 15 f.p.s. (mg./cm.²) | Corrosion Rate at 70 f.p.s. (m.p.y.) | Weight Loss at 15 f.p.s. (mg./cm.²) | Corrosion Rate at 70 f.p.s. (m.p.y.) |
| 40 | 250 | 1–3 | 40 | 9 | 240 |
| 100 | 250 | 23 | 70 | 33 | 380 |
| | 300 | 4 | 230 | (¹) | (¹) |
| 200 | 250 | 27 | 130 | 70 | 660 |

¹ No run made, since solution would form two liquid phases.

EXAMPLE VI

Figure 5:
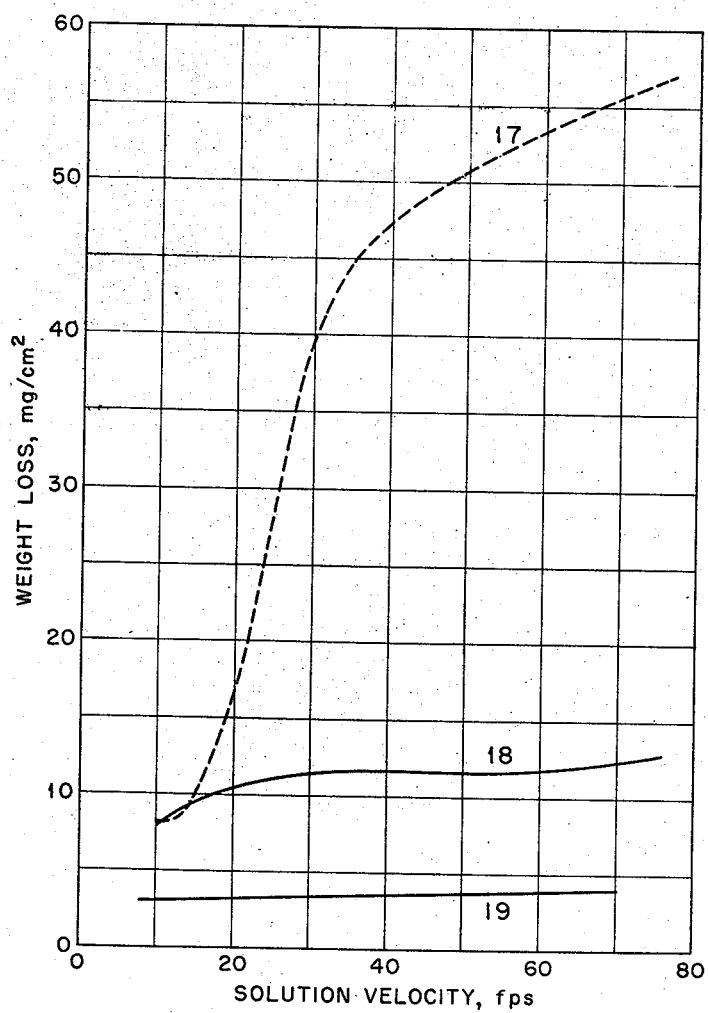

Experiments were conducted by the method of Example IV to compare the corrosion of type 347 stainless steel by a dilute aqueous uranyl sulfate-copper sulfate solution having added sulfuric acid present to stabilize the solution with the corrosion by a dilute uranyl sulfate-copper sulfate solution having added beryllium sulfate. Two hundred hour runs were conducted at various velocities with the solution having added beryllium sulfate at 200° C. and at 225° C., and runs were conducted at 225° C. for the solution containing sulfuric acid. The results obtained may be seen by reference to Fig. 5. Curve 17 represents the values obtained for a 0.04 m uranyl sulfate, 0.005 m copper sulfate, 0.02 m sulfuric acid solution at 225° C. Curve 18 represents the values obtained for a 0.04 m uranyl sulfate, 0.005 m copper sulfate, 0.04 m beryllium sulfate solution at 225° C.; and curve 19 represents the values obtained for a 0.04 m uranyl sulfate, 0.005 m copper sulfate, 0.04 m beryllium sulfate solution at 200° C. It may be readily seen that the solution with added beryllium sulfate increased in corrosiveness only slightly with increasing solution velocities, but that the solution with added sulfuric acid became much more highly corrosive at increasing solution velocities.

It is to be understood that the above examples are merely illustrative and are not to be construed as limiting the scope of our invention, which is limited only as indicated by the appended claims.

It is also to be understood that our invention is applicable to reducing the corrosiveness of both light and heavy water uranyl sulfate solutions with respect to stainless steel, generally and austenitic stainless steel in particular.

Having thus described our invention, we claim:

1. The method of treating an aqueous uranyl sulfate solution within the concentration range of 0.1 molal to 4.0 molal to reduce the corrosive properties of said solution with respect to stainless steel at temperatures of said solution within the range of 150° C. to 350° C. and elevate the phase-separation temperature of said solution which comprises maintaining lithium sulfate in said solution in the concentration range of 0.25 to 1.3 times the molal concentration of uranyl sulfate in said solution.

2. The method of claim 1 in which the concentration of lithium sulfate is in the range of 0.75 to 1.3 times the molal concentration of uranyl sulfate.

References Cited in the file of this patent

UNITED STATES PATENTS 2,820,753     Miller et al.  ------------ Jan. 21, 1958

OTHER REFERENCES

Moore: CF–56–2–140, Feb. 24, 1956 (date declassified Mar. 16, 1957), 8 pages. (Copy obtainable from Atomic Energy Commission.)

Griess at al.: CF–57–1–144, Jan. 31, 1957, 48 pages. (Copy obtainable from Atomic Energy Commission.)